United States Patent [19]
Martin

[11] 3,802,029
[45] Apr. 9, 1974

[54] SCALLOP EVISCERATOR
[75] Inventor: Roger C. Martin, Cocoa Beach, Fla.
[73] Assignee: Edgar E. Griffis, Brevard County, Fla.; a part interest.
[22] Filed: Oct. 13, 1972
[21] Appl. No.: 297,313

[52] U.S. Cl. .................................................. 17/53
[51] Int. Cl............................................. A22b 3/08
[58] Field of Search ...................... 17/45, 53, 54, 65

[56] References Cited
UNITED STATES PATENTS
3,621,515  11/1971  Bunnell................................. 17/53
3,662,432  5/1972  Wenstrom et al. .................... 17/53

Primary Examiner—Antonio F. Guida
Assistant Examiner—D. L. Weinhold
Attorney, Agent, or Firm—Berman, Bishoff & Platt

[57] ABSTRACT

An eviscerator for severing the viscera from the periphery of the scallop muscle without damaging the muscle itself is described. The scallop with the viscera attached is conveyed to an abrasive surfaced endless moving belt, across which are positioned elongated narrow rollers having abrasive surfaces and driven by variable speed hydraulic motors. The rollers are positioned approximately one-eighth inch above the belt and are mounted on swivel fittings so that the angle which they make with the direction of travel of the belt is variable. This angle, as well as the roller and belt speeds, controls the speed with which the meat passes along the rollers. As the scallop meat moves along the rollers, the belt and rollers remove the viscera from the scallop meat. Deflector plates are provided in side walls positioned above the belt, which deflect clean scallop meat on to a conveyor for further processing. Water sprays positioned above and below the belt wash the separated viscera into a pan for disposal.

10 Claims, 3 Drawing Figures

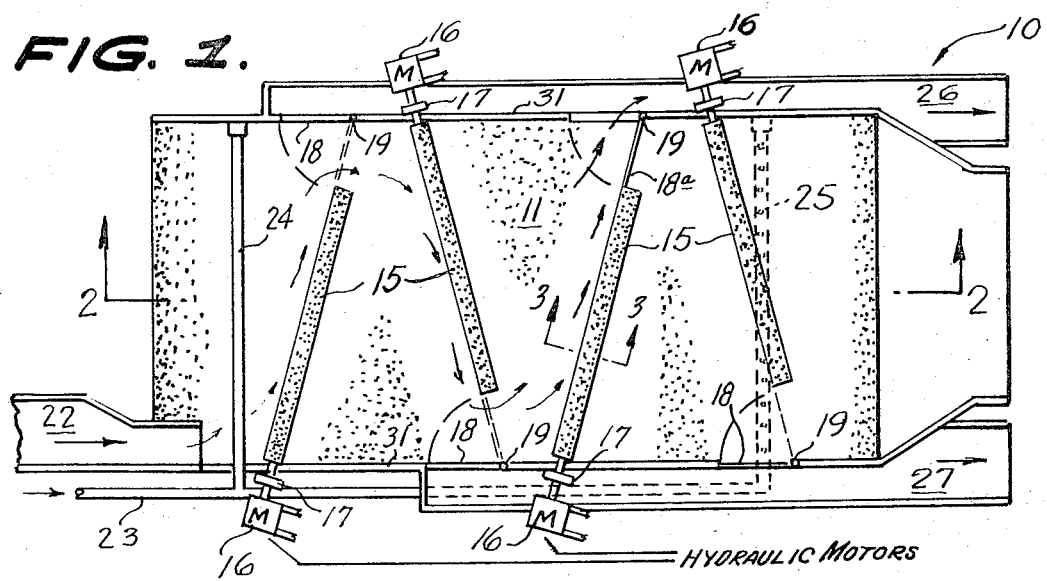
FIG. 1.
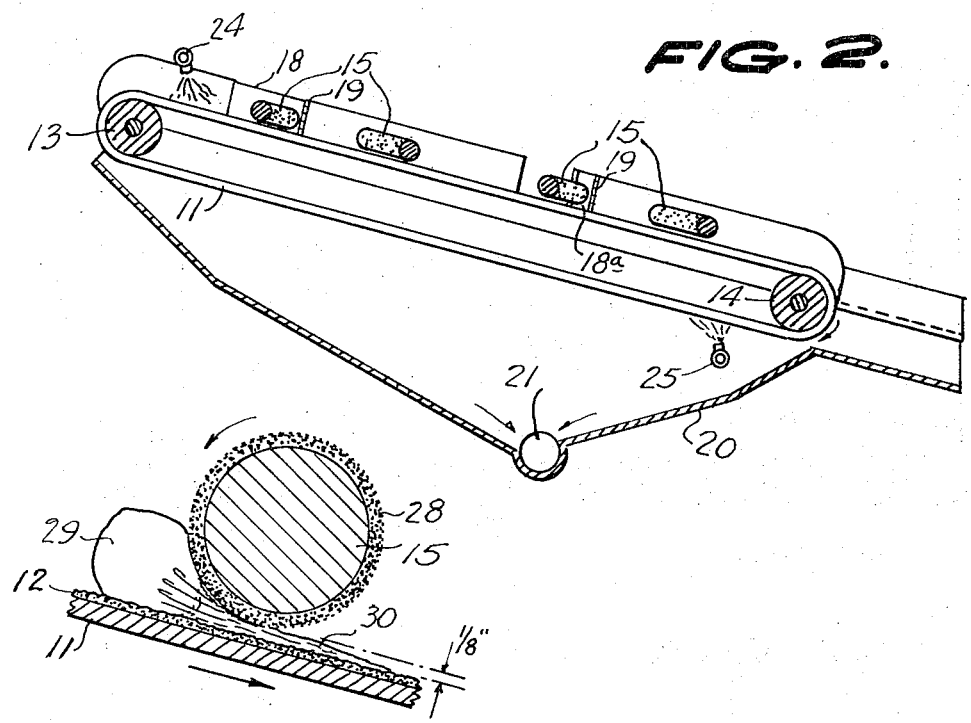
FIG. 2.
FIG. 3.

SCALLOP EVISCERATOR

This invention relates to the preparation of scallops for human consumption, and more particularly relates to a method and apparatus for removing and segregating the inedible viscera from the edible muscle portion of the scallop.

In preparing scallops for packaging for human consumption, severe difficulties have been encountered in performing one of the most critical steps in the preparation process. This step involves the separation of the edible firm muscle portion of the scallop from the undesirable, slimy viscera which holds firmly to the muscle portion and is difficult to remove. Originally, the eviscerating step in the preparation process was performed by hand, which, of course, was extremely time-consuming and costly. Lately, however, mechanical eviscerators have been put into use, but these all suffer from one or more serious disadvantages.

The most commonly used prior art mechanical eviscerator is that shown in FIG. 11 of U.S. Pat. No. 3,528,124 to Wenstrom. This type of eviscerator utilizes a sloping bank of adjacent rotating rollers, in a regularly reversing cycle, wherein adjacent rollers grab the viscera and pull it from the scallop meat. A principal objection to this type of eviscerator is the fact that an unnecessarily high percentage of edible scallop muscles or meat is pulled down between the rollers and crushed into a useless pulp. This is particularly true where smaller scallops are being processed. Moreover, these prior art machines operate inefficiently with respect to larger sized scallops, since such scallops tend to sit too high up on the rollers to become completely eviscerated and, therefore, require further hand operations to complete the evisceration step in the scallop processing.

Accordingly, it is a principal object of the present invention to provide a new and improved automatic eviscerator for scallop processing, which overcomes the above-described disadvantages of the prior art eviscerator.

A further and more specific object of the present invention is to provide an eviscerator for scallop processing which efficiently removes and segregates the viscera from the edible scallop muscle, without damaging the muscle.

Still another object of the present invention is to provide a scallop eviscerator in which the speed of travel of the scallop through the eviscerator may be readily controlled.

Still another object of the present invention is to provide a scallop eviscerator which efficiently removes the viscera from the processing area, for disposal or other use.

An additional object of the present invention is to provide a scallop eviscerator in which the eviscerated scallop may be readily removed from the processing area at any desired point, in accordance with the observed efficiency with which the eviscerator is performing its function.

Briefly, the scallop eviscerator of the present invention comprises a moving abrasive surfaced endless belt to which the scallop muscle with attached viscera is conveyed. Positioned approximately one-eighth inch above the surface of the moving belt are a plurality of elongated abrasive coated rollers swivel mounted and driven by variable speed hydraulic motors. Positioned at either side of the belt in the direction of the belt travel are raised edges having intermittently spaced hinged gates, which when swung inwardly act as deflectors, removing the cleaned scallop muscles from the belt and on to a further conveyor. As the scallop with viscera attached passes along the belt, the belt and roller remove the viscera from the meat. The angle which the rollers make with the belt is adjustable, and this angle, as well as the roller and belt speeds, controls the velocity with which the meat passes along the length of the rollers. Water sprays are positioned above and below the belt for washing away the viscera.

The above-described objects, advantages and features of the present invention will be more readily appreciated from a consideration of the following detailed description, taken in conjunction with the drawings, in which:

FIG. 1 is a top plan view of the eviscerator of the present invention;

FIG. 2 is a longitudinal sectional view taken on the line 2—2 in FIG. 1, looking in the direction of the arrows; and FIG. 3 is an enlarged transverse sectional view taken on the line 3—3 in FIG. 1, and illustrating the action of a roller and the surface of the moving belt in removing viscera from a scallop muscle.

Referring now to the drawings, wherein like reference numerals denote like parts throughout the several views thereof, there is shown an eviscerator according to the present invention, generally designated by reference numeral 10. The eviscerator comprises an endless belt 11 disposed around rollers 13 and 14 and driven in a conventional manner by any suitable variable speed motor. Rollers 13 and 14 rotate in a clockwise direction, as viewed in FIG. 2, so that the belt 11 moves from left to right, as viewed in FIG. 1.

Mounted in swivel mountings 17, of a conventional type, are narrow elongated rollers 15, rotatably driven about their longitudinal axes by hydraulic motors 16. The surface of rollers 15 is uniformly coated with an abrasive material 28, such as "Scotch-tread", manufactured by The Minnesota Mining & Manufacturing Company of St. Paul, Minn. The surface of belt 11 also contains an abrasive coating 12, which may, for example, comprise a fine emery. An alternative would be to utilize a rubber belt having a coarse grained surface. As shown in FIG. 3, rollers 15 rotate in the same direction as the travel of belt 11, or in a counterclockwise direction, as viewed in FIG. 3. The rollers 15 are mounted approximately one-eighth inch above the surface of belt 11 in order to efficiently grasp viscera 30 between the rotating surface of rollers 15 and the traveling surface of belt 11, without dragging the scallop muscle 29 under the roller.

Disposed at opposite sides of belt 11 are upstanding sides 31 having intermittently spaced therealong deflector plates 18 hingedly mounted to sides 31 at 19. The purpose of these deflector plates 18, as will be more fully explained below, is to permit the cleaned scallops 29 to be removed at any desired point along the travel of belt 11 on to further conveyors 26 and 27 for packaging or further processing, as for example at deflector plate 18a shown in FIG. 1 swung inwardly to its deflecting position.

Disposed respectively above and below belt 11 are water sprays 24 and 25 fed by water supply pipe 23. The purpose of these sprays is to wash the severed viscera from the surface of belt 11 and into pan 20 for disposal through conduit 21. It should be realized, however, that the removed viscera may be conveyed by conduit 21 to further processing apparatus, since viscera is useful for certain purposes which need not be gone into in the present application.

In operation, scallops 29 with attached viscera 30 are fed on to the left-hand portion of moving belt 11, as viewed in FIG. 1, by downwardly inclined conveyor 22. Rollers 15 are constantly rotating in the direction shown by the arrow in FIG. 3, driven by motors 16. As the scallops follow the path of the arrows in FIG. 1, particles of viscera 30 will be successively removed from the scallops 29 as they follow the described path. The speed of travel of the scallops along the length of rollers 15 and from roller to roller in the direction of the arrows, is controlled by the speeds of rotation of the rollers, the speed of travel of belt 11 and the angle which rollers 15 make with the direction of travel of the belt, which angle may be adjusted by means of swivel mounting 17. Eventually, at some predetermined point along belt 11, all the viscera will have been removed from the scallops and the cleaned scallops may thus be deflected by an open deflector plate 18, such as plate 18a in FIG. 1, and conveyed by conveyors 26 and 27 for packaging or further processing. Of course, any of the other deflector plates 18 may be swung inwardly to the deflecting position. Which deflector plate to utilize for this purpose, is solely a matter of choice, depending upon the observed efficiency with which the eviscerating process is being performed, which in turn is a function of the size of the scallops, the speed of travel of the belt, the speed of rotation of the rollers, and the angle at which the rollers are disposed. All these parameters are variable and may be adjusted to fit the particular exigencies of any situation, in order to achieve maximum efficiency in the eviscerating process.

Hydraulic motors 16 are standard components, and may, for example, be the type manufactured by Char-Lynn of Eden Prairie, Minn.

While a preferred embodiment of the invention has been described, it will be recognized by those skilled in the art that various modifications may be made therein without departing from the scope of the invention which is to be limited only by the claims appended hereto.

I claim:
1. An eviscerator for removing the viscera from scallops, comprising:
   a. substantially flat table means moving essentially linearly;
   b. at least one roller positioned above said table means;
   c. means for rotating said roller in the same direction as the movement of said table means; and
   d. means for feeding scallops with attached viscera to said table means, so that the viscera will be seized between said roller and said table means for removal from the scallop muscle.
2. The eviscerator set forth in claim 1, wherein said table means is provided with an abrasive surface.
3. The eviscerator set forth in claim 2, wherein said roller is provided with an abrasive surface.
4. The eviscerator set forth in claim 3, wherein said table means comprises an endless, rotating belt.
5. The eviscerator set forth in claim 1, wherein said roller is provided with means for adjusting its angular disposition with respect to said linear movement of the table means.
6. The eviscerator set forth in claim 5, further including pivotably mounted deflector means for deflecting eviscerated scallop meat from said table means.
7. The eviscerator set forth in claim 4, wherein a plurality of rollers are provided, and further including means for mounting said rollers so as to permit adjustment of their angular disposition with respect to said linear movement of the table means.
8. The eviscerator set forth in claim 7, further including raised sides oppositely disposed adjacent said endless belt, and deflector plates pivotably mounted in said sides for deflecting eviscerated scallop meat from said belt at a preselected one of said rollers.
9. The eviscerator set forth in claim 8, further including conveying means disposed in proximity to said deflector plates for conveying away eviscerated scallop meat.
10. The eviscerator set forth in claim 9, further including spray means disposed above and below said belt for washing away viscera therefrom.

* * * * *